US009824560B2

(12) United States Patent
Ahn

(10) Patent No.: US 9,824,560 B2
(45) Date of Patent: Nov. 21, 2017

(54) DEVICE AND METHOD FOR CONTROLLING ACTIVATION OF CRIME PREVENTION EQUIPMENT

(71) Applicant: Tae Hoon Ahn, Seoul (KR)

(72) Inventor: Tae Hoon Ahn, Seoul (KR)

( * ) Notice: Subject to any disclaimer, the term of this patent is extended or adjusted under 35 U.S.C. 154(b) by 182 days.

(21) Appl. No.: 14/889,550

(22) PCT Filed: Apr. 7, 2014

(86) PCT No.: PCT/KR2014/002967
§ 371 (c)(1),
(2) Date: Nov. 6, 2015

(87) PCT Pub. No.: WO2014/181967
PCT Pub. Date: Nov. 13, 2014

(65) Prior Publication Data

US 2016/0086467 A1 Mar. 24, 2016

(30) Foreign Application Priority Data

May 9, 2013 (KR) ........................ 10-2013-0052535

(51) Int. Cl.
*H04N 7/18* (2006.01)
*G08B 15/00* (2006.01)
*G08B 21/02* (2006.01)

(52) U.S. Cl.
CPC ........... *G08B 15/00* (2013.01); *G08B 15/004* (2013.01); *G08B 21/02* (2013.01)

(58) Field of Classification Search
CPC ....... G08B 15/00; G08B 15/004; G08B 21/02
USPC ......................... 348/143, 148, 151, 152, 157
See application file for complete search history.

(56) References Cited

U.S. PATENT DOCUMENTS

2008/0068158 A1* 3/2008 Sumiyoshi ......... G08B 13/1672
340/540

FOREIGN PATENT DOCUMENTS

KR 10-2001-0100165 A 11/2001
KR 10-2001-0103829 A 11/2001
KR 10-2003-0059027 A 7/2003
KR 10-0502718 B1 7/2005
(Continued)

*Primary Examiner* — Robert Chevalier
(74) *Attorney, Agent, or Firm* — Novick, Kim & Lee, PLLC; Jae Youn Kim

(57) ABSTRACT

Provided is a device and method for controlling the activation of crime prevention equipment, which are capable of fundamentally blocking the accidental use of the crime prevention equipment and varying operation modes of the crime prevention equipment in response to dangerous situations. The provided device may include: an image analysis unit extracting an image of another person from an image from a user terminal and analyzing a motion of the other person based on the extracted image of the other person; a voice analysis unit analyzing a frequency of voice from the user terminal and extracting a preset search word from the voice; a danger identification unit identifying a level of danger of a user based on results of the image analysis unit and the voice analysis; and an operation mode determination unit determining an operation mode in which crime prevention equipment possessed by the user is activated according to the level of danger identified by the danger identification unit, and transmitting a signal corresponding to the operation mode to the user terminal.

19 Claims, 4 Drawing Sheets

(56) References Cited

FOREIGN PATENT DOCUMENTS

| | | | |
|---|---|---|---|
| KR | 10-2011-0123968 | A | 11/2011 |
| KR | 10-2013-0032804 | A | 4/2013 |

* cited by examiner

DEVICE AND METHOD FOR CONTROLLING ACTIVATION OF CRIME PREVENTION EQUIPMENT

TECHNICAL FIELD

The present disclosure relates to a device and method for controlling the activation of crime prevention equipment, and more particularly, to a device and method for remotely controlling the activation of crime prevention equipment, such as a stun gun and gas sprayer.

The present disclosure claims priority of Korean Patent Application No. 10-2013-0052535 filed on May 5, 2013, the entire contents of which are hereby incorporated by reference.

BACKGROUND ART

In general, as society progresses and becomes complicated, cases where children become the target of crime is increasing, and crime that targets children, such as child kidnapping, violence against a child, etc. is gradually increasing.

Thus, although in order to protect children from crime, parents take their children to and from school and training has been reinforced so that they do not follow strangers, a rate of crime that targets children has not decreased.

Thus, children carry the stun gun or gas sprayer or carry equipment in which the stun gun or gas sprayer is functionally integrated with a portable phone.

As a related prior art, Korean Patent Publication No. 2001-0100165 (PERSONAL SECURITY SYSTEM AND DEVICE USING A MOBILE PHONE TERMINAL) disclosing that a user in a situation in which a damage by crime is predicted may automatically send an aid request to a security service provider, easily securing his or her safety for a certain time.

The invention in Korean Patent Publication No. 2001-00100165 includes an electrical shock unit which is disposed in the housing of a mobile phone terminal to uses the battery of the mobile phone terminal as a power source and has an electrode that may be exposed from the housing; an emergency switch that is electrically connected to the control unit of the mobile phone terminal to be able to drive the power switch of the electrical shock unit and simultaneously generate and transmit an electrical signal notifying the control unit of the mobile phone terminal that the electrical shock unit has been driven; a security service provider's phone number storage unit allocated to a storage device in the control unit of the mobile phone terminal; an automatic aid control program that is stored in the control program storage unit of the control unit of the mobile phone terminal and automatically executed upon on the turn on of the emergency switch to perform searching for a phone number stored in the security service provider's phone number storage unit, then automatically dialing by using the phone number and transmitting user position identification voice to the security service provider; and the security service provider that checks the position of the terminal through a position description by the voice provided by a mobile phone terminal user in response to the signal of the mobile phone terminal and then provides an aid service.

As another related prior art, there is Korean Patent Publication No. 2001-0103829 (PERSONAL SECURITY SYSTEM AND DEVICE USING MOBILE PHONE TERMINAL) that contains contents having the same purpose as the invention in Korean Patent Publication No. 2001-0100165.

The invention in Korean Patent Publication No. 2001-0103829 includes a gas sprayer which is disposed in the housing of a mobile phone terminal and may control the spraying of a gas by a solenoid valve electrically connected to the battery of the mobile phone terminal; an emergency switch that is electrically connected to the solenoid valve of the gas sprayer and to the control unit of the mobile phone terminal to be able to drive the solenoid valve switch of the gas sprayer and simultaneously output an electrical signal notifying the control unit of the mobile phone terminal that the gas sprayer has been driven; a security service provider's phone number storage unit allocated to a storage device in the control unit of the mobile phone terminal; an automatic aid control program that is stored in the control program storage unit of the control unit of the mobile phone terminal and automatically executed upon on the turn on of the emergency switch to perform searching for a phone number stored in the security service provider's phone number storage unit, then automatically dialing by using the phone number and transmitting user position identification voice to the security service provider; and the security service provider that checks the position of the terminal through a position description by the voice provided by a mobile phone terminal user in response to the signal of the mobile phone terminal and then provides an aid service.

However, the above-described typical arts and related prior arts may operate accidentally by the error or curiosity of a user (child) and accordingly, it is possible to astonish or hurt surrounding people against his or her will.

Although the related prior arts enable the electrical shock unit or gas sprayer to operate only when the emergency switch is pressed for a certain time, there is still a possibility that they may accidentally operate by the error or curiosity of a child.

DISCLOSURE OF THE INVENTION

Technical Problem

Embodiments provide a device and method for controlling the activation of crime prevention equipment that is capable of fundamentally blocking the accidental use of the crime prevention equipment and changing the operation modes of the crime prevention equipment in response to dangerous situations.

Technical Solution

In one embodiment, a device for controlling activation of crime prevention equipment includes an image analysis unit extracting an image of a person the user terminal and analyzing a motion of the person based on the extracted image of the person; a voice analysis unit analyzing a frequency of voice from the user terminal and extracting a preset search word from the voice; a danger identification unit identifying a level of danger of a user based on results of the image analysis unit and the voice analysis; and an operation mode determination unit determining an operation mode in which crime prevention equipment possessed by the user is activated according to the level of danger identified by the danger identification unit, and transmitting a signal corresponding to the operation mode to the user terminal.

The image analysis unit may recognize a face of the person from the image of the person and extract a motion of an arm of the person.

The search word may include slang and a word requesting help, and the voice analysis unit may detect the number of times that frequencies equal to or higher than a preset frequency are generated, from the frequency of the voice, and detect the number of times that the slang and word requesting help are generated.

Levels of danger may be classified into no danger, a low level of danger, and a high level of danger, and the danger identification unit may select one of the no danger, the low level of danger, and the high level of danger according to analysis results of the image analysis unit and the voice analysis unit.

The crime prevention equipment possessed by the user may be in plurality and the operation mode determination unit may determine an operation mode corresponding to the level of danger identified by the danger identification unit among a plurality of operation modes in which a plurality of pieces of crime prevention equipment possessed by the user is selectively activated.

The operation mode determination unit may output an operation mode signal that inactivates all of the plurality of pieces of crime prevention equipment when the danger identification unit selects the no danger.

The operation mode determination unit may output an operation mode signal that activates any one of the plurality of pieces of crime prevention equipment when the danger identification unit selects the low level of danger.

The operation mode determination unit may output an operation mode signal that activates all of the plurality of pieces of crime prevention equipment when the danger identification unit selects the high level of danger.

The crime prevention equipment may include one or more of a stun gun, a gas sprayer, and a hydrochloric acid sprayer.

The crime prevention equipment may be disposed in a user's vest, bracelet, necklace, belt, bag, shoulder strap, or gloves.

The device may further include an image/voice storage unit storing an image and voice from the user terminal.

The device may further include a notification unit notifying an external contact that the user is in danger, according to the level of danger identified by the danger identification unit.

In another embodiment, a method of controlling activation of crime prevention equipment includes extracting an image of a person from the user terminal and analyzing a motion of the person based on the extracted image of the person, by an image analysis unit; analyzing a frequency of voice from the user terminal and extracting a preset search word from the voice, by a voice analysis unit; identifying a level of danger of a user by a danger identification unit based on a result of the analysis; and determining, by an operation mode determination unit, an operation mode in which crime prevention equipment possessed by the user is activated according to the level of danger identified by the identifying of the level of danger of the user, and transmitting an operation mode signal corresponding to the operation mode to the user terminal.

The analyzing of the motion of the person may include recognizing a face of the person from the image of the person and extracting a motion of an arm of the person.

The search word may include slang and a word requesting help, and the analyzing of the frequency of the voice and the extracting of the preset search word from the voice may include detecting the number of times that frequencies equal to or higher than a preset frequency are generated, from the frequency of the voice, and detecting the number of times that the slang and word requesting help are generated.

The method may further include storing, by an image/voice storage unit, an image and voice from the user terminal.

The method may further include notifying, by a notification unit, an external contact that the user is in danger, according to the level of danger identified by the identifying of the level of danger of the user.

Advantageous Effects

According to the present disclosure of such a configuration, it is possible to fundamentally block the accidental use of crime prevention equipment by activating the crime prevention equipment only in an actually dangerous situation, not by mistake or for fun when a user, such as a child attempts to operate the crime prevention equipment.

In addition, it is possible to change the operation mode of the crime prevention equipment in response to a degree of a dangerous situation in which a user, such as a child is.

MODE FOR CARRYING OUT THE INVENTION

Figure 1:
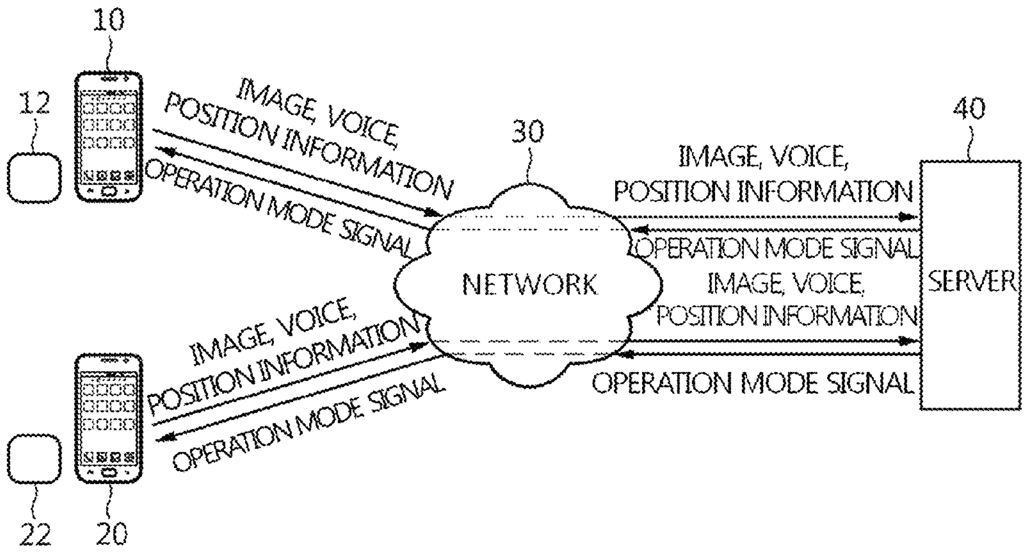
FIG. 1 illustrates a network to which the present disclosure has been applied.

In the following, a device and method for controlling the activation of crime prevention equipment according to an embodiment of the present disclosure is described with reference to the accompanying drawings. Before the detailed description of the present disclosure, the terms or words used in the specification and claims as will be provided below should not be construed limitatively as a typical or literary meaning. Thus, since embodiments in the specification and configurations in the drawings are only exemplary embodiments of the present disclosure and do not thoroughly represent the technical spirit of the present disclosure, it should be noted that there may be various equivalents and variations that may replace them when the present application is filed.

FIG. 1 illustrates a network to which the present disclosure has been applied.

In the present disclosure, it is assumed that a user (e.g., a child) possesses a user terminal 10 or 20 and crime prevention equipment 12 or 22.

The user terminal 10 or 20 only needs to transmit image data, voice data, position information, etc. to a server 40 through a network 30 and receive an operation mode signal from the server to perform an operation corresponding thereto.

The crime prevention equipment 11 or 22 may be disposed at a user's vest, bracelet, necklace, belt, gloves, etc. In this example, the crime prevention equipment 12 or 22 may be a stun gun, gas sprayer, hydrochloric acid sprayer, etc. The gas sprayer sprays a tear gas and may also be equipment that sprays a tear liquid. The configurations and actions of the stun gun, gas sprayer and hydrochloric acid sprayer may be sufficiently understood from known technologies by a person skilled in the art. Although the stun gun or gas sprayer may be disposed at the user's vest, bracelet, necklace, belt, etc., the stun gun, gas sprayer and hydrochloric acid sprayer may also be disposed together. The crime prevention equipment 11 or 22 may be any equipment that sprays instantaneous adhesives in addition to the stun gun, gas sprayer, and hydrochloric acid sprayer. The crime prevention equipment 12 or 22 is activated or inactivated based on an input operation mode signal.

In the following embodiments of the present disclosure, it is assumed that the stun gun, gas sprayer and hydrochloric acid sprayer are disposed at the user's vest, bracelet, necklace, belt, gloves, etc.

The server 40 is a device that may control the activation of the crime prevention equipment 12 or 22 remotely. The server 40 receives image data, voice data, position data, etc. from the user terminal 10 or 20 through the network 30, determines a level of danger in which a corresponding user is currently, and transmits a corresponding operation mode (i.e., operation mode in which the crime prevention mode 12 or 22 is activated) signal to a corresponding user terminal 10 or 20.

Figure 2:
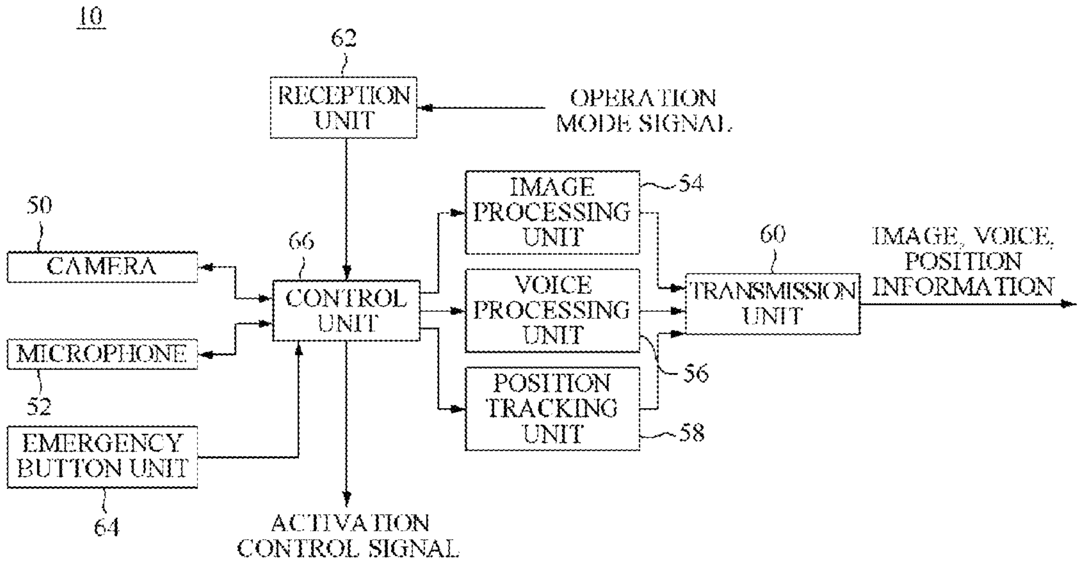
FIG. 2 is an internal block diagram of a user terminal in FIG. 1.

FIG. 2 is an internal block diagram of a user terminal in FIG. 1. FIG. 1 shows two user terminals 10 and 20 but it is considered that there is a need to describe only the user terminal 10 because the two user terminals 10 and 20 have the same configuration in terms of function.

The user terminal 10 includes a camera 50, a microphone 52, an image processing unit 54, a voice processing unit 56, a position tracking unit 58, a transmission unit 60, a reception unit 62, an emergency button unit 64, and a control unit 66.

The camera 50 images things around a user as well as the user. That is, the camera 50 may automatically operate to image a user in front of the camera and things around the user (including a person who attempts to commit a crime), when the emergency button (not shown) of the emergency button unit 64 is ON. The camera 50 may be used to image the person who attempts to commit a crime. The camera 50 may be in plurality. When the camera 50 is in plurality, it is possible to image many situations in front of the camera and thus it is possible to contribute to crime prevention more efficiently.

The microphone 52 collects the voice (vocalization) of the person who attempts to commit a crime as well as the voice (vocalization) of the user. The microphone 52 automatically operates when the emergency button (not shown) of the emergency button unit 64 is ON.

The image processing unit 54 removes noise from an image imaged by the camera 50 and converts the image into a data format that may be transmitted to the server 40. In this example, since a data format conversion technique in the image processing unit 54 may be fully understood from a known technology by a person skilled in the art, related descriptions are not provided.

The voice processing unit 56 removes noise from voice collected by the microphone 52 and converts the voice into a data format that may be transmitted to the server 40. In this example, since a data format conversion technique in the voice processing unit 56 may be fully understood from a known technology by a person skilled in the art, related descriptions are not provided.

The position tracking unit 58 tracks the position of a corresponding user terminal 10 to output position information. For example, the position tracking unit 58 may use a global positioning system (GPS) to track the position of a corresponding user terminal 10. Besides the GPS, it is possible to identify the position through WCDMA or WiFi and it is also possible to identify the position by together applying the technologies as described above. WCDMA or WiFi may solely identify the position on behalf of the GPS technology but is poorer in precision than the position identification through the GPS. Thus, WCDMA or WiFi may perform a role in assisting the position identification through the GPS in a shadow area that may not receive a signal from a satellite.

The transmission unit 60 transmits image data from the image processing unit 54, voice data from the voice processing unit 56, and position information from the position tracking unit together to the server 40 through the network 30. The transmission unit 60 may transmit identification information (e.g., ID) on a corresponding user terminal when transmitting the image data, voice data and position data. The server 40 may identify from which user terminal the information is transmitted, only when the identification information on a corresponding user terminal 10 is together transmitted.

The reception unit 62 receives an operation mode received from the server 40 through the network 30.

The emergency button unit 64 is controlled when a user is in danger. The emergency button unit 64 includes an emergency button (not shown).

As the emergency button of the emergency button unit 64 is ON, the control unit 66 automatically operates the camera 50 and microphone 52 to transmit the image data, voice data and position data from the image processing unit 54, voice processing unit 56 and position tracking unit 58 to the server 40. In addition, the control unit 66 activates or inactivates the crime prevention equipment 12 based on an operation mode signal received by the reception unit 62.

Figure 3:
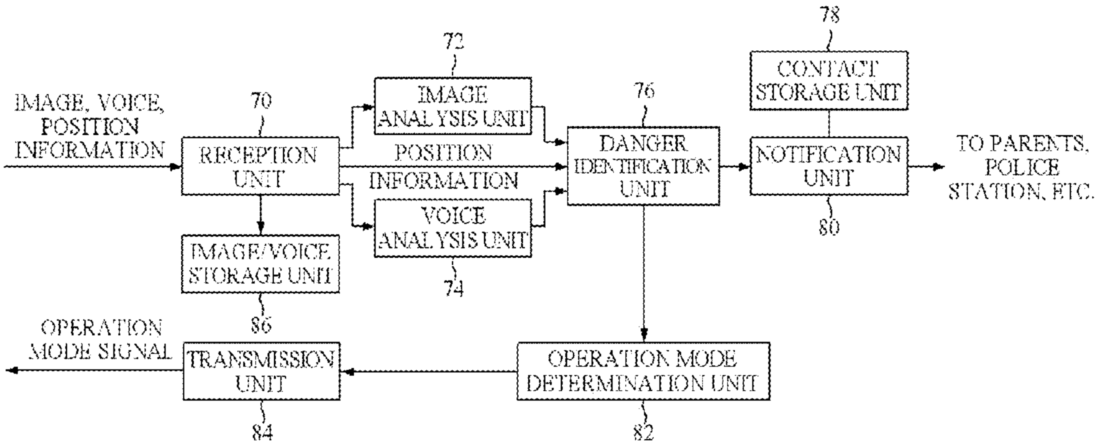
FIG. 3 is an internal block diagram of a device for controlling the activation of crime prevention equipment according to an embodiment of the present disclosure.
Figure 4:
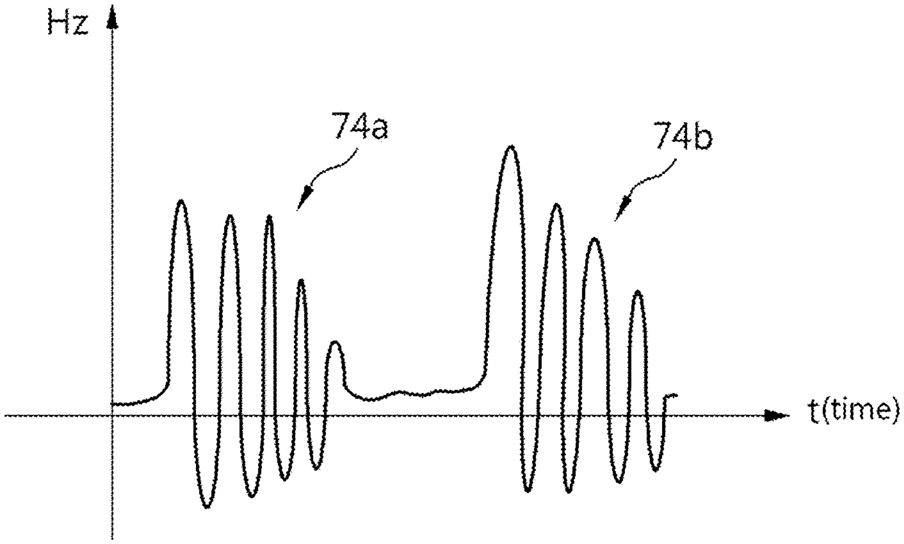
FIG. 4 is a graph of an example of a voice frequency which is employed in voice analysis by a voice analysis unit in FIG. 3.

FIG. 3 is an internal block diagram of a device for controlling the activation of crime prevention equipment according to an embodiment of the present disclosure, and FIG. 4 is a graph of an example of a voice frequency which is employed in voice analysis by a voice analysis unit in FIG. 3.

The device for controlling the activation of the crime prevention equipment according to the embodiment of the present disclosure, namely, the server 40 includes a reception unit 70, an image analysis unit 72, a voice analysis unit 74, a danger identification unit 76, a contact storage unit 78, a notification unit 80, an operation mode determination unit 82, a transmission unit 84, and an image/voice storage unit 86.

The reception unit 70 receives image data, voice data and position information received from the user terminal 10 or 20 through the network 30.

The image analysis unit 72 extracts an image of a person from the user terminal 10, 20 and analyzes the motion of the person based on the extracted image of the person.

The image analysis unit 72 recognizes the face (or pupil) of the person from the image of the person and extracts the state and motion of the arm of the person in order to identify whether the person attempts to commit a crime. The face recognition of the person is needed for further notice. Since the person who attempts to commit a crime often holds the user, extracting the current state of the arm of the person and the motion of the arm would be helpful in identifying a crime attempt. In this example, since the face recognition and extracting the motion of the arm may be fully understood from a known technology by a person skilled in the art, related descriptions are not provided.

The image analysis unit 72 may also first perform an operation of removing noise from an image from the user terminal 10 or 20 as needed.

The voice analysis unit 74 analyzes the frequency of voice from the user terminal 10 or 20 and analyzes a preset search word from the voice. In this example, the search word may include slang, a word requesting help, etc.

The voice analysis unit 74 detects the number of times that frequencies 74*a* and 74*b* equal to or higher than a preset frequency are generated, from the frequency of the input voice as shown in FIG. 4. In addition, the voice analysis unit 74 detects the number of times that the slang and the word requesting help are generated. The frequencies 74*a* and 74*b* equal to or higher than the preset frequency may correspond to a scream provided by a user.

In order to detect the number of times that the slang and the word requesting help are generated, the voice analysis unit 74 may first detect the start point and end point of the voice from vocalization by using the end point detection of the voice to detect voice activity. In this example, the end point detection of the voice may be fully understood from a known art by a person skilled in the art. Then, it is determined whether the vocalization of the detected voice activity matches pre-stored reference vocalization (i.e., reference vocalization for slang, a word requesting help, etc.), and if positive, the number of times that the slang or word requesting help is generated increases by +1 . In this case, the voice analysis unit 74 may be considered that it uses a voice recognition technology, which may be fully understood from a known art by a person skilled in the art.

The voice analysis unit 74 may also perform an operation of removing noise from voice from the user terminal 10 or 20 as a top priority.

The danger identification unit 76 identifies a level of danger of a user at the current position based on position information and the analysis results of the image analysis unit 72 and the voice analysis unit 74. In this example, levels of danger may be classified into no danger, a low level of danger, and a high level of danger. That is, the danger identification unit 76 selects one of the no danger, the low level of danger and the high level of danger according to the analysis results of the image analysis unit 72 and the voice analysis unit 74.

For example, when data from the image analysis unit 72 and the voice analysis unit 72 is data corresponding to when there is no image of another person, no frequencies 74*a* and 74*b* equal to or higher than a preset frequency are generated and no slang and word requesting help are generated, the danger identification unit 76 may select the no danger. When data from the image analysis unit 72 and the voice analysis unit 72 is data corresponding to when there is no image of another person and no frequencies 74*a* and 74*b* equal to or higher than a preset frequency are generated or no slang and word requesting help are generated, the danger identification unit 76 may select the no danger. When data from the image analysis unit 72 and the voice analysis unit 72 is data corresponding to when there is an image of another person but no frequencies 74*a* and 74*b* equal to or higher than a preset frequency are generated and no slang and word requesting help are generated, the danger identification unit 76 may select no danger.

In addition, when data from the image analysis unit 72 and the voice analysis unit 72 is data corresponding to when another person holds a user, the frequencies 74*a* and 74*b* equal to or higher than a preset frequency is generated less than a certain number of times (e.g., five times) and the slang and word requesting help are generated less than a certain number of times (e.g., five times), the danger identification unit 76 may select the low level of danger. When data from the image analysis unit 72 and the voice analysis unit 72 is data corresponding to when another person holds a user and the frequencies 74*a* and 74*b* equal to or higher than a preset frequency are generated more than a certain number of times (e.g., five times), the danger identification unit 76 may select the low level of danger. When data from the image analysis unit 72 and the voice analysis unit 72 is data corresponding to when another person holds a user and the slang and word requesting help are generated more than a certain number of times (e.g., five times), the danger identification unit 76 may select the low level of danger. When data from the image analysis unit 72 and the voice analysis unit 72 is data corresponding to when another person does not hold a user but the frequencies 74*a* and 74*b* equal to or higher than a preset frequency is generated more than a certain number of times (e.g., five times) and the slang and word requesting help are generated more than a certain number of times (e.g., five times), the danger identification unit 76 may select the low level of danger.

In addition, when data from the image analysis unit 72 and the voice analysis unit 72 is data corresponding to when another person holds a user, the frequencies 74*a* and 74*b* equal to or higher than a preset frequency is generated more than a certain number of times (e.g., five times) and the slang and word requesting help are generated more than a certain number of times (e.g., five times), the danger identification unit 76 may select the high level of danger.

The certain number of times provided as five times is only an example and may be fully adjusted without a limitation thereto. Also, combinations of the no danger, low level of danger and high level of danger that are provided as examples above may vary.

The contact storage unit 78 stores contact information by user. In this example, the contact information may vary according to the low level of danger and the high level of danger. For example, in the case of the low level of danger, the contact information may be mapped to be capable of contacting only with the parents of a corresponding user. In the case of the high level of danger, the contact information may be mapped to be capable of contacting with all of the parents of a corresponding user, a police station, etc.

The notification unit 80 notifies an external contact that the user is in danger, based on information in the contact storage unit 78 according to the level of danger identified by the danger identification unit 76. In this case, when the level of danger identified by the danger identification unit 76 is the low level of danger, the notification unit 80 may call the parents of a corresponding user and/or transmit a SMS message to them. When the level of danger identified by the danger identification unit 76 is the high level of danger, the notification unit 80 may call the parents of a corresponding user, a police station, etc. and/or transmit a SMS message to them.

The motion mode determination unit 82 determines an operation mode in which the crime prevention equipment 12 or 22 possessed by a corresponding user is activated according to the level of danger identified by the danger identification 76, and transmits a corresponding signal to a corresponding user terminal or 20. In this case, when the crime prevention equipment possessed by a user is in plurality, the motion mode determination unit 82 determines an operation mode that corresponds to the level of danger identified by the danger identification unit 76 among a plurality of operation modes in which a plurality of pieces of crime prevention equipment possessed by the user is selectively activated. For example, when the danger identification unit 76 selects the no danger, the operation mode determination unit 82 may output an operation mode signal that enables the plurality of pieces of crime prevention equipment to be all inactivated. When the danger identification unit 76 selects the low level of danger, the operation mode determination unit 82 may output an operation mode signal that activates any one (e.g., a stun gun) of the plurality of pieces of crime prevention equipment. When the danger identification unit 76 selects the high level of danger, the operation mode determination unit 82 may output an operation mode signal that activates all (e.g., a stun gun, gas sprayer and hydrochloric acid sprayer) of the plurality of pieces of crime prevention equipment.

The transmission unit 84 transmits the operation mode signal output from the operation mode determination unit 82 to a user terminal through the network 30.

The image/voice storage unit 86 stores images and voice from the user terminal 10 or 20. This is needed for identifying and reporting another person who has attempted to commit a crime.

In FIG. 3, the image analysis unit 72 and the voice analysis unit 74 may be examples of the analysis unit set forth in the claims of the present disclosure. The analysis unit set forth in the claims of the present disclosure receives and analyzes audiovisual information (i.e., an image or voice) from the user terminal 10 or 20. Thus, the analysis unit set forth in the claims of the present disclosure may be understood as collectively representing the image analysis unit 72 and the voice analysis unit 74.

Figure 5:
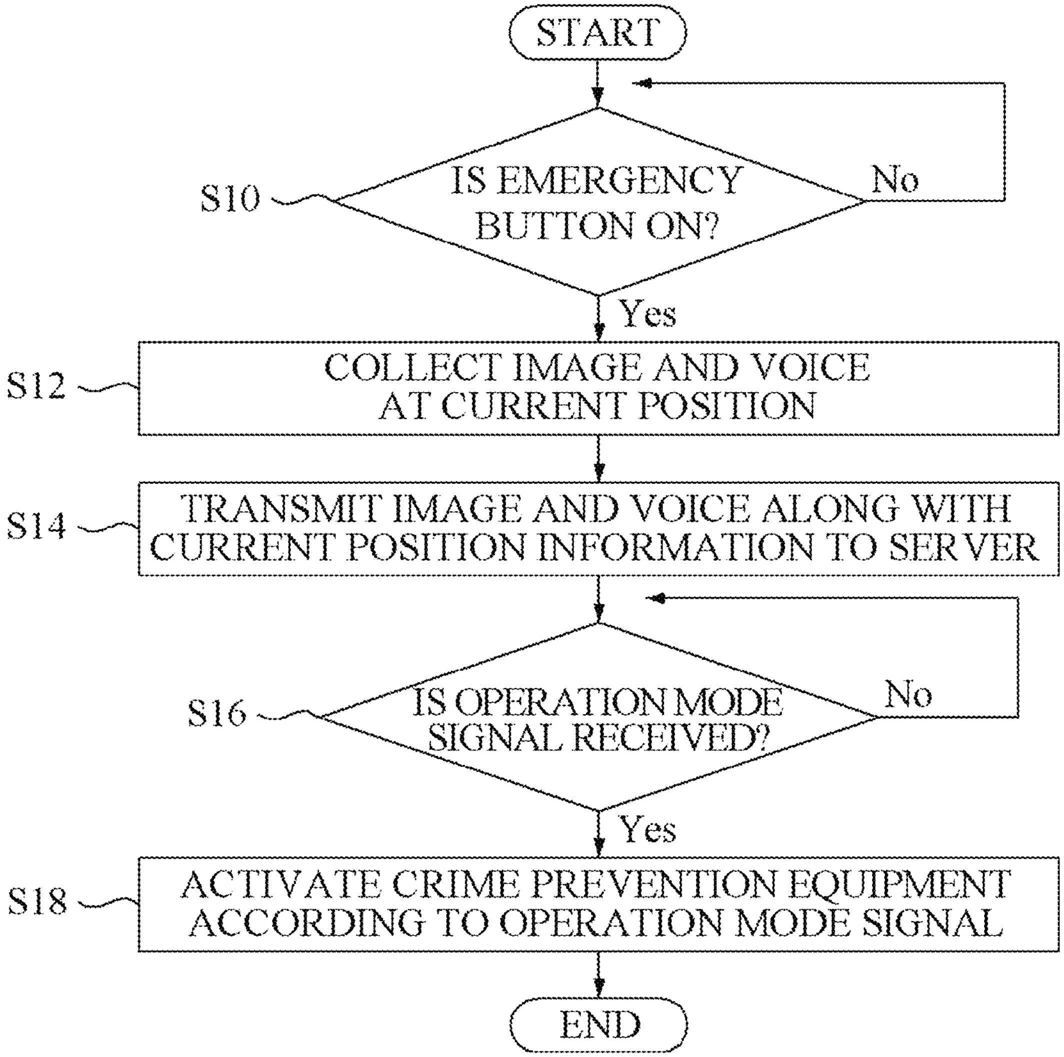
FIG. 5 is a flowchart of the action of a user terminal in FIG. 2.

Next, the actions of the user terminal in FIG. 2 is described with reference to the flowchart of FIG. 5.

When a user makes the emergency button of the emergency button unit 64 ON (Yes in step S10), the control unit 66 automatically operates the camera 50 and the microphone 52.

Thus, the camera 50 images things in front of the camera, and the microphone 52 collects voice from the position of a corresponding user in step S12.

The imaged image is transmitted to the image processing unit 54 and the collected voice is transmitted to the voice processing unit 56. Thus, the image processing unit 54 removes noise from the image imaged by the camera 50 and converts the image into a data format that may be transmitted to the server 40. The voice processing unit 56 removes noise from the voice collected by the microphone 52 and converts the voice into a data format that may be transmitted to the server 40.

The image data and voice data converted in this way is transmitted to the server 40 through the transmission unit 60 along with current position information on a corresponding user from the position tracking unit 58. In this case, identification information (e.g., ID) on a corresponding user terminal 10 is also transmitted together.

Then, when the reception unit 62 of the corresponding user terminal 10 receives an operation mode signal from the server 40 (Yes in step S16), the control unit 66 activates the crime prevention equipment 12 according to the type of the operation mode signal received by the reception unit 62 in step S18. For example, when the received operation mode signal is a signal that inactivates all of the plurality of pieces of crime prevention equipment (i.e., a signal corresponding to the no danger), the plurality of pieces of crime prevention equipment possessed by the corresponding user do not operate. When the received operation mode signal is a signal that activates any one (e.g., a stun gun) of the plurality of pieces of crime prevention equipment (i.e., a signal corresponding to the low level of danger), only the stun gun is activated. When the received operation mode signal is a signal that activates all (e.g., a stun gun, gas sprayer and hydrochloric acid sprayer) of the plurality of pieces of crime prevention equipment (i.e., a signal corresponding to the high level of danger), all of the stun gun, gas sprayer, and hydrochloric acid sprayer are activated.

Thus, when the operation mode signal corresponding to the no danger is received, any equipment does not operate even when a user attempts to operate any of the plurality of pieces of crime prevention equipment.

When the operation mode signal corresponding to the low level of danger is received, a user may operate the stun gun to become free from danger because e.g., the stun gun is activated.

When the operation mode signal corresponding to the high level of danger is received, the user may operate one or more of the stun gun, gas sprayer, and hydrochloric acid sprayer to become free from danger because e.g., all of the stun gun, gas sprayer, and hydrochloric acid sprayer are activated.

Figure 6:
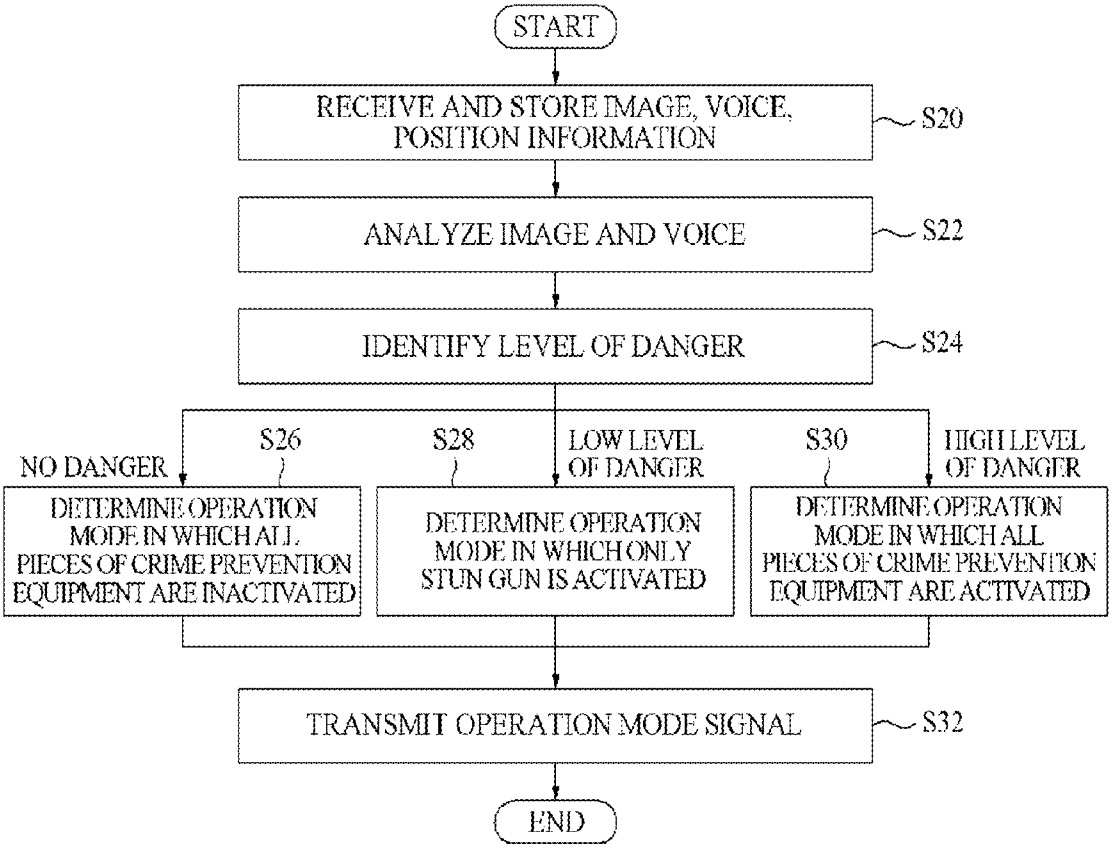
FIG. 6 is a flowchart of a method of controlling the activation of crime prevention equipment according to an embodiment of the present disclosure.

Lastly, a method of controlling the activation of crime prevention equipment according to an embodiment of the present disclosure is described with reference to a flowchart of FIG. 6.

Firstly, the reception unit 70 receives image data, voice data and position information from a user terminal 10, for example. The received image data and voice data stored in the image/voice storage unit 86 in step S20.

Subsequently, the image analysis unit 72 extracts an image of another person from an image from the user terminal 10 and analyzes the motion of the another person based on the extracted image of the other person, and the voice analysis unit 74 analyzes the frequency of voice from the user terminal 10 and extracts a preset search word from the voice, in step S22.

Then, the danger identification unit 76 identifies a level of danger of a user at the current position (any one of no danger, a low level of danger, and a high level of danger) based on the position information and the analysis results of the image analysis unit 72 and the voice analysis unit 74 in step S24.

If the identified level of danger is the no danger, the motion mode determination unit 82 determines an operation mode in which all of the pieces of crime prevention equipment possessed by a corresponding user are inactivated, in step S26.

When the identified level of danger is the low level of danger, the operation mode determination unit 82 determines an operation mode in which only any one of the pieces of crime prevention equipment possessed by a corresponding user is activated, in step S28. In this case, when the identified level of danger is the low level of danger, the notification unit 80 calls the parents of a corresponding user and/or transmits a SMS message to them, although not shown in FIG. 6.

If the identified level of danger is the high level of danger, the motion mode determination unit 82 determines an operation mode in which all of the pieces of crime prevention equipment possessed by a corresponding user are activated, in step S30. In this case, when the identified level of danger is the high level of danger, the notification unit 80 calls the parents of a corresponding user, a police station, etc. and/or transmits a SMS message to them, although not shown in FIG. 6.

Then, a signal (i.e., operation mode signal) corresponding to the operation mode determined by the operation mode determination unit 82 is transmitted to a user terminal through the transmission unit 84 in step S32.

The above-described crime prevention equipment 12 or 22 may be disposed in a bag or shoulder strap. In this case, the crime prevention equipment 12 or 22 disposed in the bag or shoulder strap may have sound recording and video recording independently from the camera 50 and microphone 52 of the user terminal 10 or 20. When the crime prevention equipment 12 or 22 is disposed in the shoulder strap in this way, it is possible to image things in front of another person who attempts to commit a crime, from the shoulder height of a corresponding child and it is possible to later monitor a path from home to school of a corresponding child. Thus, the crime prevention equipment 12 or 22 disposed in the bag or shoulder strap may be a device, such as a personal black box.

When the above-described crime prevention equipment 12 or 22 is disposed in a vest, a rechargeable solar battery is disposed in the vest and a non-isolated conductor is connected to the solar battery. One or more non-isolated conductors are disposed in the vest. In this case, when the above-described crime prevention equipment 12 or 22 is activated, a current flows into the non-isolated conductor and thus it is possible to apply an electric shock to another person who attempts to commit a crime.

When the above-described crime prevention equipment 12 or 22 is disposed in the gloves, it is possible to accurately apply an electric shock, spray a gas and spray hydrochloric acid to another person who attempts to commit a crime.

Optimal embodiments have been disclosed in the drawings and in the specification as discussed above. Although specific terms are used herein, they are used for the purpose of describing the present disclosure and not used in order to limit the scope of the present disclosure set forth in the claims. Therefore, a person skilled in the art would understand that various variations and equivalent embodiments may be implemented from the present disclosure. Thus, the true technical protective scope of the present disclosure would be defined by the technical spirit of the claims.

The invention claimed is:

1. A device for controlling activation of crime prevention equipment, the device comprising:

an analysis unit analyzing audio visual information from a user terminal;

a danger identification unit identifying a level of danger of a user based on a result of the analysis unit; and an operation mode determination unit determining an operation mode in which the crime prevention equipment possessed by the user is activated according to the level of danger identified by the danger identification unit, and transmitting an operation mode signal corresponding to the operation mode to the user terminal, wherein the analysis unit comprises:

an image analysis unit extracting an image of a person from the user terminal and analyzing a motion of the person based on the extracted image of the person, and a voice analysis unit analyzing a frequency of a voice from the user terminal and extracting a preset search word from the voice.

2. The device according to claim 1, wherein the user terminal activates the crime prevention equipment based on the operation mode signal and the crime prevention equipment operates when an operation ON command is input in an activation state.

3. The device according to claim 1, wherein the image analysis unit recognizes a face of the person from the image of the person and extracts a motion of an arm of the person.

4. The device according to claim 1, wherein the search word comprises slang and a word requesting help, and the voice analysis unit detects the number of times that frequencies equal to or higher than a preset frequency are generated, from the frequency of the voice, and detects the number of times that the slang and word requesting help are generated.

5. The device according to claim 1, wherein the level of danger includes a no danger level, a low level of danger, and a high level of danger, and the danger identification unit selects one of the no danger level, the low level of danger, and the high level of danger according to an analysis result of the analysis unit.

6. The device according to claim 5, wherein the crime prevention equipment possessed by the user is in plurality and the operation mode determination unit determines an operation mode corresponding to the level of danger identified by the danger identification unit among a plurality of operation modes in which a plurality of pieces of crime prevention equipment possessed by the user is selectively activated.

7. The device according to claim 6, wherein the operation mode determination unit outputs an operation mode signal that inactivates all of the plurality of pieces of crime prevention equipment when the danger identification unit selects the no danger level.

8. The device according to claim 6, wherein the operation mode determination unit outputs an operation mode signal that activates any one of the plurality of pieces of crime prevention equipment when the danger identification unit selects the low level of danger.

9. The device according to claim 6, wherein the operation mode determination unit outputs an operation mode signal that activates all of the plurality of pieces of crime prevention equipment when the danger identification unit selects the high level of danger.

10. A device for controlling activation of crime prevention equipment, the device comprising:

an analysis unit analyzing audio visual information from a user terminal;

a danger identification unit identifying a level of danger of a user based on a result of the analysis unit; and an operation mode determination unit determining an operation mode in which the crime prevention equipment possessed by the user is activated according to the level of danger identified by the danger identification unit, and transmitting an operation mode signal corresponding to the operation mode to the user terminal, wherein the crime prevention equipment comprises one or more of a stun gun, a gas sprayer, and a hydrochloric acid sprayer.

11. The device according to claim 1, wherein the crime prevention equipment is disposed in a user's vest, bracelet, necklace, belt, bag, shoulder strap, or gloves.

12. The device according to claim 1, further comprising an image/voice storage unit storing the image and voice from the user terminal.

13. The device according to claim 1, further comprising a notification unit notifying an external contact that the user is in danger, according to the level of danger identified by the danger identification unit.

14. A method of controlling activation of crime prevention equipment, the method comprising:

analyzing audio visual information from a user terminal by an analysis unit;

identifying a level of danger of a user by a danger identification unit based on a result of the analysis; and determining, by an operation mode determination unit, an operation mode in which the crime prevention equipment possessed by the user is activated according to the level of danger identified by the danger identification unit, and transmitting an operation mode signal corresponding to the operation mode to the user terminal, wherein the analyzing of the audio visual information comprises:

extracting an image of a person from the user terminal and analyzing a motion of the person based on the extracted image of the person; and analyzing a frequency of a voice from the user terminal and extracting a preset search word from the voice.

15. The method according to claim 14, wherein the user terminal activates the crime prevention equipment based on the operation mode signal and the crime prevention equipment operates when an operation ON command is input in an activation state.

16. The method according to claim 14, wherein the analyzing of the motion of the person comprises recognizing a face of the person from the image of the person and extracting a motion of an arm of the person.

17. The method according to claim 14, wherein the search word comprises slang and a word requesting help, and the analyzing of the frequency of the voice and the extracting of the preset search word from the voice comprises detecting the number of times that frequencies equal to or higher than a preset frequency are generated, from the frequency of the voice, and detecting the number of times that the slang and word requesting help are generated.

18. The method according to claim 14, further comprising storing, by an image/voice storage unit, the image and voice from the user terminal.

19. The method according to claim 14, further comprising notifying, by a notification unit, an external contact that the user is in danger, according to the level of danger identified by the danger identification unit.

* * * * *